United States Patent
Arora

(10) Patent No.: US 11,748,747 B2
(45) Date of Patent: Sep. 5, 2023

(54) METHOD AND SYSTEM FOR PAYMENT CARD VERIFICATION VIA BLOCKCHAIN

(71) Applicant: MASTERCARD INTERNATIONAL INCORPORATED, Purchase, NY (US)

(72) Inventor: Ankur Arora, New Delhi (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 118 days.

(21) Appl. No.: 17/452,863

(22) Filed: Oct. 29, 2021

(65) Prior Publication Data

US 2022/0044235 A1    Feb. 10, 2022

Related U.S. Application Data

(62) Division of application No. 15/366,010, filed on Dec. 1, 2016, now Pat. No. 11,188,900.

(51) Int. Cl.
*G06Q 20/38*   (2012.01)
*G06Q 20/32*   (2012.01)
(Continued)

(52) U.S. Cl.
CPC ....... *G06Q 20/3829* (2013.01); *G06Q 20/065* (2013.01); *G06Q 20/20* (2013.01);
(Continued)

(58) Field of Classification Search
CPC .. G06Q 20/3829; G06Q 20/065; G06Q 20/20; G06Q 20/3223; G06Q 20/3274;
(Continued)

(56) References Cited

U.S. PATENT DOCUMENTS

2013/0110658 A1   5/2013  Lyman et al.
2015/0046336 A1*  2/2015  Cummins .......... G06Q 20/3274
                                                      705/41
(Continued)

OTHER PUBLICATIONS

Antonopoulos, Mastering Bitcoin, Dec. 2014, O'Reilly Media.*
(Continued)

*Primary Examiner* — Steven S Kim
*Assistant Examiner* — Zesheng Xiao
(74) *Attorney, Agent, or Firm* — PANITCH SCHWARZE BELISARIO & NADEL LLP

(57) ABSTRACT

A method for conveyance of payment credentials through a third party data source includes: storing, in a memory of a computing device, at least a first public key and payment credentials associated with a transaction account; generating, by a generation module of the computing device, a machine-readable code encoded with at least the first public key; displaying, by a display device interfaced with the computing device, the generated machine-readable code; generating, by the generation module of the computing device, a key pair comprised of at least a private key and a second public key; encrypting, by an encryption module of the computing device, the payment credentials using the private key; and electronically transmitting, by a transmitting device of the computing device, the encrypted payment credentials to a publicly accessible data source.

6 Claims, 7 Drawing Sheets

(51) Int. Cl.
    *G06Q 20/20*     (2012.01)
    *G06Q 20/36*     (2012.01)
    *G06Q 20/06*     (2012.01)
    *G06Q 20/40*     (2012.01)

(52) U.S. Cl.
    CPC ..... *G06Q 20/3223* (2013.01); *G06Q 20/3274* (2013.01); *G06Q 20/36* (2013.01); *G06Q 20/388* (2013.01); *G06Q 20/401* (2013.01); *G06Q 2220/00* (2013.01)

(58) Field of Classification Search
    CPC .... G06Q 20/36; G06Q 20/388; G06Q 20/401; G06Q 2220/00
    See application file for complete search history.

(56) References Cited

U.S. PATENT DOCUMENTS

| | | | |
|---|---|---|---|
| 2015/0100475 A1 | 4/2015 | Cummings et al. | |
| 2016/0253663 A1* | 9/2016 | Clark ................ | G06Q 20/3678 705/75 |

OTHER PUBLICATIONS

Notification of Transmittal of the International Search Report and the Written Opinion of the International Searching Authority (Forms PCT/ISA/220, PCT/ISA/210 and PCT/ISA/237) dated Feb. 26, 2018, by the European Patent office in corresponding International Application No. PCT/US2017/058427. (13 pages).

Margaret Rouse, What is multisig (multisignature), Jul. 19 2016, WhatIs.com (Year: 2016).

* cited by examiner

METHOD AND SYSTEM FOR PAYMENT CARD VERIFICATION VIA BLOCKCHAIN

FIELD

The present disclosure relates to the verification of payment credentials via the use of blockchains or other publicly accessible data sources, specifically the use of encryption and the transmission of data between a computing device and a point of sale to accommodate the retrieval and usage of verified payment credentials without the use of a traditional payment instrument.

BACKGROUND

For many consumers, convenience can be just as important as security when it comes to paying for purchases. Accommodating consumer convenience has led to the creation and rise of payment cards and other payment instruments that utilize near field communication and other transmission techniques for conveying payment credentials from a payment instrument to a point of sale with minimal effort by the consumer. Such methods often enable a consumer to simply press a button on their mobile computing device or wave their payment card near a point of sale terminal to transmit payment credentials, simplifying the user experience.

However, the wireless transmission of payment credentials can be subject to intercept. Skimming devices have been developed that enable a nefarious actor to pull the payment credentials from a payment instrument, even when securely located in the consumer's wallet or purse, or to intercept the payment credentials as they are being wirelessly transmitted to the point of sale device. As a result, many consumers may feel unsafe to utilize more convenient methods of conveying payment details, instead opting for more secure methods that require additional time and actions to be performed by the consumer.

Thus, there is a need for a technological solution to enable the conveyance of payment credentials to a point of sale device that requires minimal participation by the consumer, while still maintaining a high level of security, particularly against skimming. This presents technical difficulties in trying to accomplish both security and convenience. What is presented herein provides a technical solution that improves the technology used in conveying payment card credentials from plastic cards, chip enabled cards and mobile computing devices.

SUMMARY

The present disclosure provides a description of systems and methods for the conveyance and receipt of payment credentials to and at a point of sale device through the use of a third party data source. The use of a third party data source enables an individual to transact safely without concern for their payment credentials being skimmed from their payment instrument, or without having to even carry a payment instrument entirely. The transaction may be conducted via the display of a machine-readable code to the point of sale device, which may further prevent skimming as the reading of such a code can be more easily controlled via control of the underlying display; the display can be easily shielded and is often obscured when in a pocket or purse.

A method for conveyance of payment credentials through a third party data source includes: storing, in a memory of a computing device, at least a first public key and payment credentials associated with a transaction account; generating, by a generation module of the computing device, a machine-readable code encoded with at least the first public key; displaying, by a display device interfaced with the computing device, the generated machine-readable code; generating, by the generation module of the computing device, a key pair comprised of at least a private key and a second public key; encrypting, by an encryption module of the computing device, the payment credentials using the private key; and electronically transmitting, by a transmitting device of the computing device, the encrypted payment credentials to a publicly accessible data source.

A method for retrieval of payment credentials from a third party data source includes: reading, by an input device of a point of sale device, a machine-readable code displayed by a computing device; decoding, by a decoding module of the point of sale device, the machine-readable code to identify at least a public key; receive, by a receiving device of the point of sale device, encrypted payment credentials from a publicly accessible data source; decrypting, by a decryption module of the point of sale device, the encrypted payment credentials using the public key; and electronically transmitting, by a transmitting device of the point of sale device, the decrypted payment credentials and transaction data for processing in a payment transaction.

A system for conveyance of payment credentials through a third party data source includes: a memory of a computing device configured to store at least a first public key and payment credentials associated with a transaction account; a generation module of the computing device configured to generate a machine-readable code encoded with at least the first public key, and a key pair comprised of at least a private key and a second public key; a display device interfaced with the computing device configured to display the generated machine-readable code; an encryption module of the computing device configured to encrypt the payment credentials using the private key; and a transmitting device of the computing device configured to electronically transmit the encrypted payment credentials to a publicly accessible data source.

A system for retrieval of payment credentials from a third party data source includes: an input device of a point of sale device configured to read a machine-readable code displayed by a computing device; a decoding module of the point of sale device configured to decode the machine-readable code to identify at least a public key; a receiving device of the point of sale device configured to receive encrypted payment credentials from a publicly accessible data source; a decryption module of the point of sale device configured to decrypt the encrypted payment credentials using the public key; and a transmitting device of the point of sale device configured to electronically transmit the decrypted payment credentials and transaction data for processing in a payment transaction.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
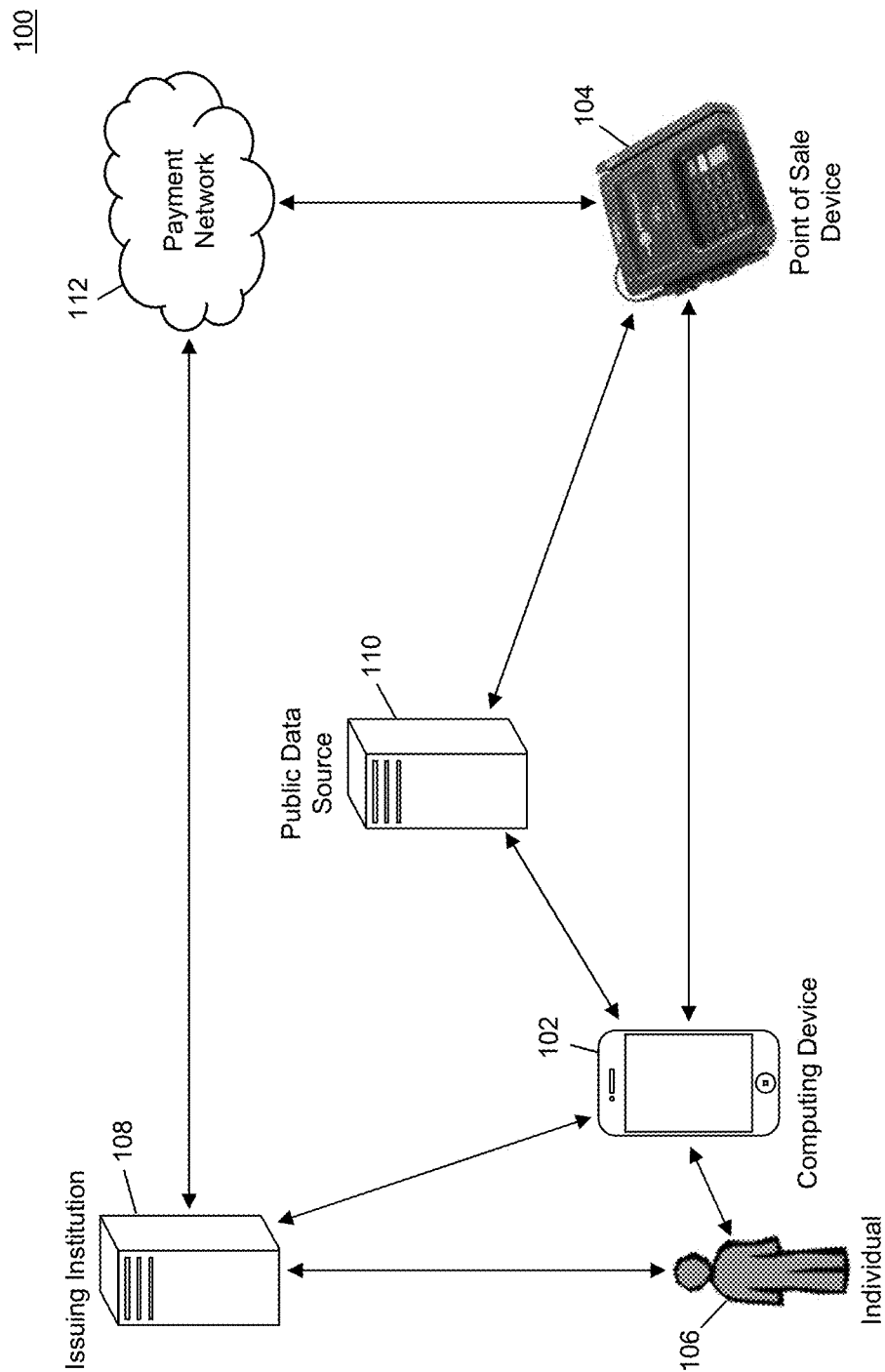
FIG. 1 is a block diagram illustrating a high level system architecture for conveying payment credentials through a third party data source in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software executed on hardware, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable.

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Third Party Conveyance of Payment Credentials

FIG. 1 illustrates a system 100 for the conveyance of payment credentials to a point of sale device for use in a payment transaction through a third party data source, where the payment credentials are not usable by the point of sale device without receipt of data from a separate computing device.

The system 100 may include a computing device 102. The computing device 102 may be a specifically configured device that is specially configured and programmed to perform the functions discussed herein for the conveyance of data to a point of sale device 104 for use in the retrieval and usage of payment credentials in an electronic payment transaction. The computing device 102 may be any suitable computing device capable of being specifically configured for performing the functions discussed herein, such as a desktop computer, laptop computer, notebook computer, tablet computer, cellular phone, smart phone, smart watch, wearable computing device, implantable computing device, etc. The point of sale device 104 may be any type of point of sale device that is specially configured to perform the functions discussed herein.

The computing device 102 may be used by an individual 106 to facilitate the conveyance of payment credentials to the point of sale device 104 for use in the funding of an electronic payment transaction. In the system 100, an issuing institution 108 may issue a transaction account directly to the individual 106, or may issue a transaction account for which the individual 106 is an authorized user. The issuing institution 108 may be a financial institution, such as an issuing bank, or any other suitable type of entity that is configured to issue transaction accounts that may be used to fund electronic payment transactions. As part of the issuing of the transaction account usable by the individual 106, the issuing institution 108 may generate payment credentials associated with the payment account. Payment credentials may be included in data submitted for the processing of an electronic payment transaction to indicate the transaction account to be used in funding the transaction. Payment credentials may include at least a primary account number, and may also include additional data as necessary for the processing of a payment transaction, such as a name, expiration date, security code, transaction counter, payment cryptogram, etc.

The issuing institution 108 may provision payment credentials for the transaction account to the individual's computing device 102. In some embodiments, the payment credentials may be provisioned to the computing device 102 as an image of a payment card, wherein the image contains the data used to identify and verify the transaction account during transaction processing. In other embodiments, the payment credentials may be stored in a data file that is electronically transmitted to the computing device 102. The computing device 102 may receive the payment credentials and store them therein. In some embodiments, the payment credentials may be stored in a trusted environment, Secure Element, or other secured data storage mechanism.

Prior to the conducting of a transaction, the computing device 102 may generate a key pair. The key pair may be comprised of a private key and a corresponding public key, and may be generated using any suitable key generation algorithm, such as the elliptic curve Diffie-Hellman key agreement scheme. The key pair may be stored in the computing device 102, and may, in some instances, be stored in the same location as the payment credentials. The computing device 102 may, using the private key, encrypt the payment credentials. The computing device 102 may then electronically transmit the encrypted payment credentials to a public data source 110. The public data source 110 is publically available, at least to a large group of people or entities that are not under common control, such as a blockchain, as explained below The public data source 110 may be any suitable type of data source that is publicly accessible or otherwise accessible by any point of sale device 104 configured for performing the functions discussed herein. The public data source 110 may receive the encrypted payment credentials and may make them available for retrieval to point of sale devices 104. In some embodiments, the public data source 110 may generate a unique identifier to be associated with the encrypted payment credentials, which may be electronically transmitted back to the computing device 102 for reference thereto. The unique identifier may also be referred to herein as a "transaction identifier," as the value may be unique to a given electronic payment transaction, as discussed below.

In some embodiments, the public data source 110 may be a blockchain network. In such embodiments, the encrypted payment credentials may be electronically transmitted to a node of the blockchain network, where the node may include the encrypted payment credentials in a block that is verified and added to the blockchain using traditional methods. In some cases, the node may identify a transaction identifier associated with the posting of the encrypted payment credentials to the blockchain, which may be electronically transmitted to the computing device 102 for identification of the encrypted payment credentials in the blockchain. In some such embodiments, the computing device 102 may possess a private key (e.g., separate from the private key used to encrypt the payment credentials), which may be associated with the blockchain network and used to generate digital signatures for verification of the computing device 102 by nodes of the blockchain network. In such instances, the computing device 102 may be configured to digitally sign the encrypted payment credentials prior to submission to the blockchain network. The private key used to generate the digital signature may be part of a key pair, where the corresponding public key may be possessed by the blockchain network.

To conduct a payment transaction, the computing device 102 may (e.g., upon receipt of instruction by the individual 106) generate a machine-readable code. The machine-readable code may be encoded with at least the public key of the key pair generated for encryption of the payment credentials. In instances where a transaction identifier was received by the computing device 102, the transaction identifier may also be encoded in the machine-readable code. In cases where the public data source 110 is a blockchain network and the computing device 102 digitally signs the encrypted payment credentials, the machine-readable code may be further encoded with a public key corresponding to the private key used to generate the digital signature. The machine-readable code may be any suitable type of code, such as a bar code or quick response (QR) code.

The computing device 102 may display the machine-readable code. The point of sale device 104 may be equipped with a reading device, such as an optical imager, which may be configured to read the machine-readable code. The point of sale device 104 may then decode the machine-readable code to obtain the public key, and any other additional data (e.g., the transaction identifier and additional public key) encoded therein. The point of sale device 104 may then communicate with the public data source 110 to retrieve the encrypted payment credentials. In instances where a transaction identifier was decoded from the machine-readable code, the point of sale device 104 may convey the transaction identifier to the public data source 110 for identification of the corresponding encrypted payment credentials. The public data source 110 may identify the encrypted payment credentials, which may be electronically transmitted back to the point of sale device 104. In embodiments where the encrypted payment credentials are digitally signed, the point of sale device 104 may be configured to verify the digital signature using the public key associated therewith decoded from the machine-readable code, such as to ensure the encrypted payment credentials are genuine.

The point of sale device 104 may then use the public key (e.g., of the key pair used to encrypt the payment credentials) that was decoded from the machine-readable code to decrypt the payment credentials. The decrypted payment credentials may then be used in the processing of an electronic payment transaction. In embodiments where the payment credentials may be included in an image of a payment card, the point of sale device 104 may be configured to parse the payment credentials from the image, such as using optical character recognition techniques. The point of sale device 104 may be configured to electronically transmit transaction data for the payment transaction, including the decrypted payment credentials, for processing by a payment network 112. Transaction data may include the decrypted payment credentials, a transaction amount, currency type, transaction time, transaction date, geographic location, merchant name, merchant identification number, merchant category code, acquirer data, issuer data, product data, offer data, reward data, loyalty data, etc. In some embodiments, the point of sale device 104 may electronically transmit the transaction data directly to the payment network 112. In other embodiments, the transaction data may be transmitted to the payment network 112 via one or more intermediate entities, such as an acquiring financial institution associated with a merchant operating the point of sale device 104.

The payment network 112 may receive the transaction data, which may be stored in data elements included in a transaction message received by the payment network 112, where the transaction message may be a specially formatted data messaged that is formatted pursuant to one or more standards governing the exchange of financial transaction messages, such as the International Organization of Standardization's ISO 8583 and 20022 standards. The payment network 112 may then process the payment transaction using traditional methods and systems. As part of the processing, an authorization request may be forwarded to the issuing institution 108, which may identify the transaction account using the payment credentials and approve or deny the transaction based thereon. The payment network 112 may receive a response from the issuing institution 108 indicating approval or denial, and may inform the point of sale device 104 accordingly for finalization of the transaction. In exemplary embodiments, the point of sale device 104 may be configured to discard the encrypted payment credentials, decrypted payment credentials, and public key.

After the transaction is completed, the computing device 102 may be configured to delete the originally generated key pair and generate a new key pair comprised of a new private key and new public key. The computing device 102 may encrypt the payment credentials using the new private key (e.g., and digitally sign, if applicable), and electronically transmit the encrypted (e.g., and signed) payment credentials to the public data source 110. The public data source 110 may then make the newly encrypted payment credentials publicly accessible. In some embodiments, the public data source 110 may replace the original encrypted payment credentials with the new encrypted payment credentials. In other embodiments, the public data source 110 may delete, hide, or otherwise render inaccessible the original encrypted payment credentials. In embodiments where the public data source 110 may be a blockchain network, the new encrypted payment credentials may be added to a new block, where the blockchain may also indicate that the original encrypted payment credentials are no longer usable. For instance, encrypted blockchain credentials may be posted with a blockchain address (e.g., corresponding to the computing device 102, such as based on the private key used thereby in generating digital signatures), such that point of sale devices 104 may be configured to only use the encrypted payment credentials for a given blockchain address most recently added to the blockchain.

In some embodiments, the computing device 102 may be configured to initiate the new encryption and transmission of the newly encrypted payment credentials to the public data source 110 upon the receipt of an indication that the processing of the payment transaction was completed, such as may be received from the point of sale device 104 or the issuing institution 108. In other embodiments, the computing device 102 may be configured to initiate the new encryption and transmission following display of the machine-readable code. In some such embodiments, the new encrypted payment credentials may be electronically transmitted to the public data source 110 after a predetermined period of time of the display of the machine-readable code (e.g., three minutes) such as to prevent abuse or unauthorized usage of the encrypted payment credentials.

The methods and systems discussed herein enable an individual 106 to participate in an electronic payment transaction without having to transmit payment credentials directly to a point of sale device 104. As there is no transmission of payment credentials, and as the public key is only transmitted via the display of a machine-readable code, none of the data required for retrieval and decryption of the payment credentials may be obtained via skimming or interception of a transmission originating from the computing device 102. In addition, the reading of the machine-readable code by an unauthorized device may yield only the code; the unauthorized device must be specially configured to decode the machine-readable code, identify the public data source 110 that stores the encrypted payment credentials, identify the correct encrypted payment credentials, and utilize the correct algorithm in the decryption of the encrypted payment credentials, in order to make use of the transaction account. Thus, the methods and systems discussed herein provide not only greater convenience to the individual 106, but also significantly increase account security due to the steps required for any unauthorized usage of the transaction account.

Computing Device

Figure 2:
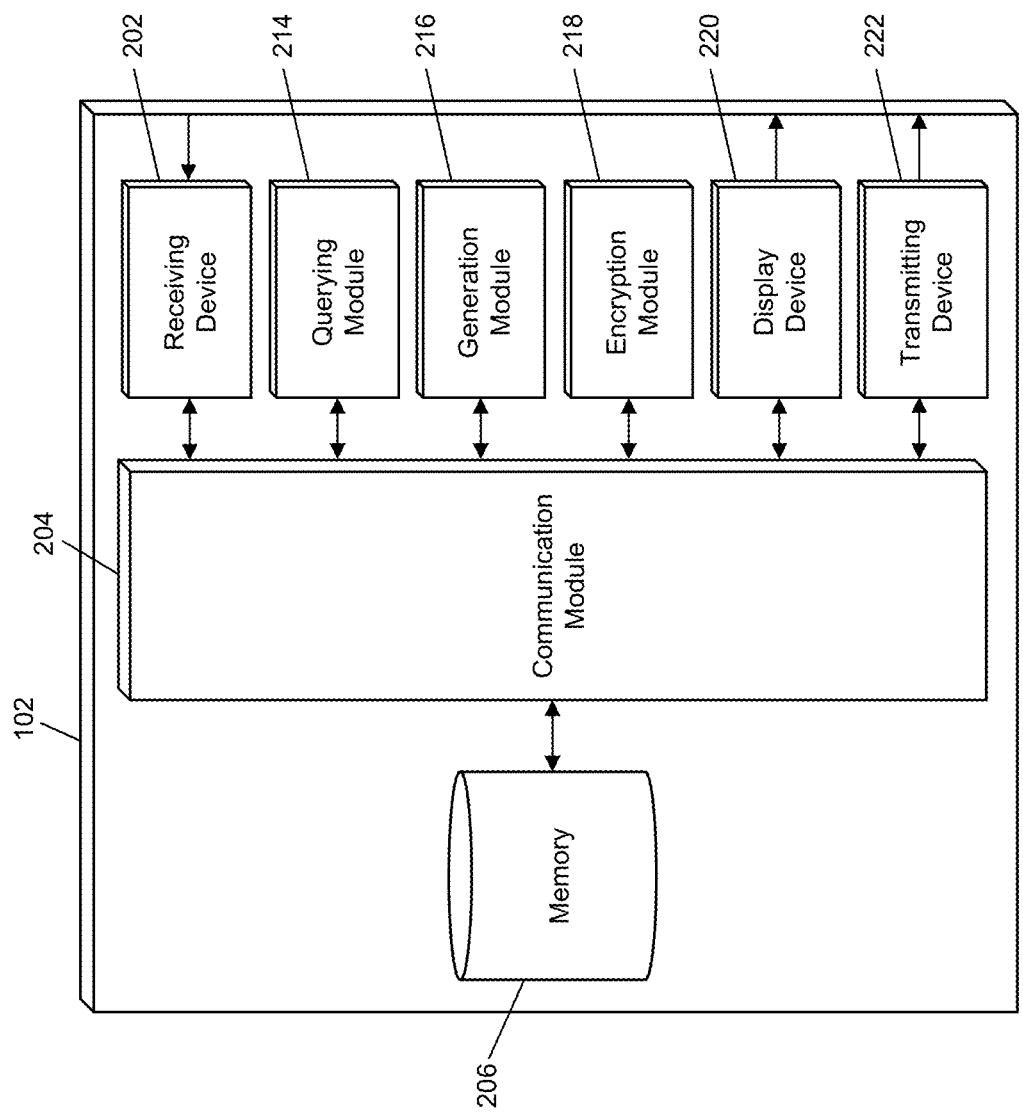
FIG. 2 is a block diagram illustrating the computing device of FIG. 1 for the conveyance of payment credentials via a third party data source in accordance with exemplary embodiments.

FIG. 2 illustrates an embodiment of a computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 700 illustrated in FIG. 7 and discussed in more detail below may be a suitable configuration of the computing device 102.

The computing device 102 may include a receiving device 202. The receiving device 202 may be configured to receive data over one or more networks via one or more network protocols. In some instances, the receiving device 202 may be configured to receive data from issuing institutions 108, point of sale devices 104, public data sources 110, interfaced input devices, and other systems and entities via one or more communication methods, such as near field communication, cellular communication networks, local area networks, Bluetooth, etc. In some embodiments, the receiving device 202 may be comprised of multiple devices, such as different receiving devices for receiving data over different networks, such as a first receiving device for receiving data over near field communication and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuing institutions 108, which may be superimposed or otherwise encoded with payment credentials being provisioned to the computing device 102. The receiving device 202 may also be configured to receive data signals electronically transmitted by point of sale devices 104, issuing institutions 108, and/or public data sources 110, which may be superimposed or otherwise encoded with indications of completed processing of an electronic transaction, such as for initiating new encryption of payment credentials. In some embodiments, the receiving device 202 may also be configured to receive data signals electronically transmitted by public data sources 110 that are superimposed or otherwise encoded with a transaction identifier for submitted encrypted payment credentials.

The computing device 102 may also include a communication module 204. The communication module 204 may be configured to transmit data between modules, engines, databases, memories, and other components of the computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, encryption module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 102 may also include a memory 206. The memory 206 may be configured to store data for use by the computing device 102 in performing the functions discussed herein, such as public and private keys, symmetric keys, etc. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

The memory 206 may be configured to store payment credentials provisioned thereto. In some instances, the memory 206 may include a trusted environment, Secure Element, or other secured data storage, which may be used to store the payment credentials. The memory 206 may also be configured to store key pairs generated by the computing device 102 and used for performing the functions discussed herein, such as key pairs used in the encryption and decryption of the payment credentials and key pairs used in the generation and verification of digital signatures.

The computing device 102 may include a querying module 214. The querying module 214 may be configured to execute queries on databases to identify information. The querying module 214 may receive one or more data values or query strings, and may execute a query string based thereon on an indicated database, such as the memory 206, to identify information stored therein. The querying module 214 may then output the identified information to an appropriate engine or module of the computing device 102 as necessary. The querying module 214 may, for example, execute a query on the memory 206 to identify payment credentials stored therein for encryption and transmission to a public data source 110 for use in an electronic payment transaction.

The computing device 102 may also include a generation module 216. The generation module 216 may be configured to generate data for use in performing the functions of the computing device 102 as discussed herein. The generation module 216 may receive instructions as input, which may be used to generate data, and the generated data output to one or more engines or modules of the computing device 102. In some instances, the instructions input to the generation module 216 may be accompanied by data for use therewith. For example, the generation module 216 may be configured to generate a digital signature for encrypted payment credentials prior to transmission to the public data source 110. The generation module 216 may also be configured to generate key pairs using suitable key pair generation algorithms, where each key pair may be comprised of a private key and corresponding public key. In some instances, the generation module 216 may use different key pair generation algorithms, such as a first key pair generation algorithm for key pairs used for encryption and a second key pair generation algorithm for key pairs used for digital signatures. The generation module 216 may also be configured to generate machine-readable codes, such as bar codes or QR codes, which may be encoded with at least a public key used for decryption of encrypted payment credentials, and may also be encoded with a transaction identifier and a public key used for verification of a digital signature.

The computing device 102 may also include an encryption module 218. The encryption module 218 may be configured to encrypt data as part of the functions of the computing device 102 as discussed herein. The encryption module 218 may receive data as input, may encrypt the data, and may output the data to another module or engine of the computing device 102. In some embodiments, the input may include the encryption algorithm(s) used for encryption. In other embodiments, the encryption module 218 may be configured to identify the encryption algorithm(s) to be used, such as by instructing the querying module 214 to execute a query on the memory 206 for identification thereof. The encryption module 218 may be configured to encrypt payment credentials using private keys generated by the generation module 216 using one or more suitable encryption algorithms.

The computing device 102 may also include or be otherwise interfaced with a display device 220. The display device 220 may be internal to the computing device 102 or external to the computing device 102 and connected thereto via one or more connections (e.g., wired or wireless) for the transmission of data to and/or from. The display device 220 may be configured to display data to a user of the computing device 102, such as the individual 106. The display device 220 may be any type of display suitable for displaying data as part of the functions discussed herein, such as a liquid crystal display, light emitting diode display, thin film transistor display, capacitive touch display, cathode ray tube display, light projection display, etc. In some instances, the computing device 102 may include multiple display devices 220. The display device 220 may be configured to, for example, display machine-readable codes encoded with at least public keys used for decryption of encrypted payment credentials.

The computing device 102 may also include a transmitting device 222. The transmitting device 222 may be configured to transmit data over one or more networks via one or more network protocols. In some instances, the transmitting device 222 may be configured to transmit data to issuing institutions 108, point of sale devices 104, public data sources 110, and other entities via one or more communication methods, such as near field communication, the Internet, local area networks, Bluetooth, radio frequency, etc. In some embodiments, the transmitting device 222 may be comprised of multiple devices, such as different transmitting devices for transmitting data over different networks, such as a first transmitting device for transmitting data over a cellular communication network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals to public data sources 110 that are superimposed or otherwise encoded with encrypted payment credentials, which may, in some embodiments, be digitally signed by the computing device 102. The transmitting device 222 may also be configured to electronically transmit data signals to issuing institutions 108, such as may be superimposed or otherwise encoded with data used for management of the payment credentials and the corresponding transaction account, such as requests for private keys, requests for new payment credentials, etc.

Point of Sale Device

Figure 3:
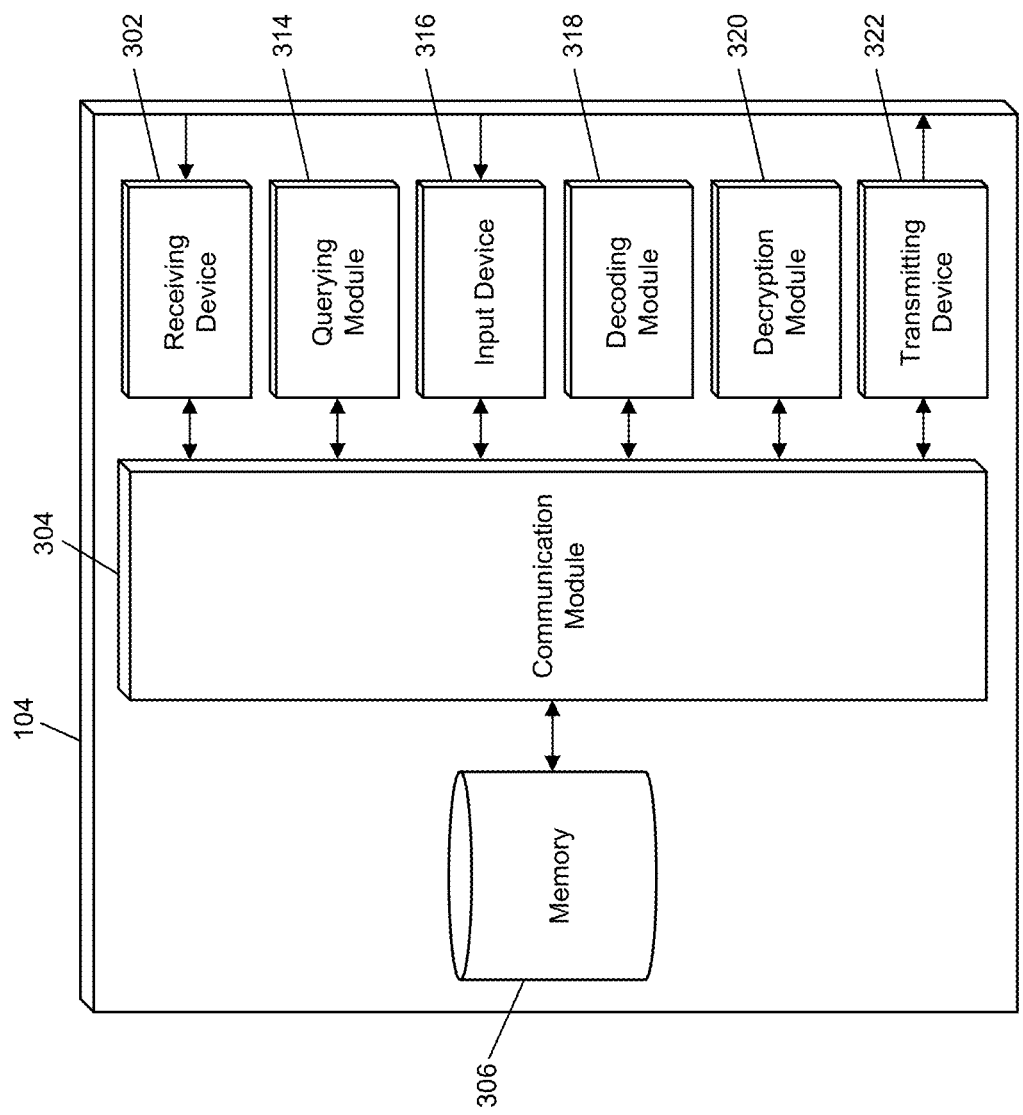
FIG. 3 is a block diagram illustrating the point of sale device of FIG. 1 for the receipt of payment credentials via a third party data source in accordance with exemplary embodiments.

FIG. 3 illustrates an embodiment of a point of sale device 104 in the system 100. It will be apparent to persons having skill in the relevant art that the embodiment of the point of sale device 104 illustrated in FIG. 3 is provided as illustration only and may not be exhaustive to all possible configurations of the point of sale device 104 suitable for performing the functions as discussed herein. For example, the computer system 700 illustrated in FIG. 7 and discussed in more detail below may be a suitable configuration of the point of sale device 104.

The point of sale device 104 may include a receiving device 302. The receiving device 302 may be configured to receive data over one or more networks via one or more network protocols. In some embodiments, the receiving device 302 may be configured to receive data over the payment rails, such as using specially configured infrastructure associated with payment networks 112 for the transmission of transaction messages that include sensitive financial data and information. In some instances, the receiving device 302 may also be configured to receive data from computing devices 102, public data sources 110, payment networks 112, and other entities via alternative networks, such as the Internet. In some embodiments, the receiving device 302 may be comprised of multiple devices, such as different receiving devices for receiving data over different networks, such as a first receiving device for receiving data over payment rails and a second receiving device for receiving data over the Internet. The receiving device 302 may receive electronically transmitted data signals, where data may be superimposed or otherwise encoded on the data signal and decoded, parsed, read, or otherwise obtained via receipt of the data signal by the receiving device 302. In some instances, the receiving device 302 may include a parsing module for parsing the received data signal to obtain the data superimposed thereon. For example, the receiving device 302 may include a parser program configured to receive and transform the received data signal into usable input for the functions performed by the processing device to carry out the methods and systems described herein.

The receiving device 302 may be configured to receive data signals electronically transmitted by public data sources 110, which may be superimposed or otherwise encoded with encrypted (e.g., and signed, as applicable) payment credentials. The receiving device 302 may also be configured to receive data signals electronically transmitted by payment networks 112, which may be superimposed or otherwise encoded with data indicating the successful processing of a payment transaction, which may also indicate if the payment transaction was approved or denied.

The point of sale device 104 may also include a communication module 304. The communication module 304 may be configured to transmit data between modules, engines, databases, memories, and other components of the point of sale device 104 for use in performing the functions discussed herein. The communication module 304 may be comprised of one or more communication types and utilize various communication methods for communications within a computing device. For example, the communication module 304 may be comprised of a bus, contact pin connectors, wires, etc. In some embodiments, the communication module 204 may also be configured to communicate between internal components of the point of sale device 104 and external components of the point of sale device 104, such as externally connected databases, display devices, input devices, etc. The point of sale device 104 may also include a processing device. The processing device may be configured to perform the functions of the point of sale device 104 discussed herein as will be apparent to persons having skill in the relevant art. In some embodiments, the processing device may include and/or be comprised of a plurality of engines and/or modules specially configured to perform one or more functions of the processing device, such as a querying module 314, decoding module 318, decryption module 320, etc. As used herein, the term "module" may be software or hardware particularly programmed to receive an input, perform one or more processes using the input, and provides an output. The input, output, and processes performed by various modules will be apparent to one skilled in the art based upon the present disclosure.

The point of sale device 104 may also include a memory 306. The memory 306 may be configured to store data for use by the point of sale device 104 in performing the functions discussed herein, such as public and private keys, symmetric keys, etc. The memory 306 may be configured to store data using suitable data formatting methods and schema and may be any suitable type of memory, such as read-only memory, random access memory, etc. The memory 306 may include, for example, transaction data for a payment transaction to be initiated upon receipt and decryption of encrypted payment credentials. The memory 306 may also be configured to store algorithms used for the decryption of encrypted payment credentials and verification of digital signatures.

The point of sale device 104 may include a querying module 314. The querying module 314 may be configured to execute queries on databases to identify information. The querying module 314 may receive one or more data values or query strings, and may execute a query string based thereon on an indicated database, such as the memory 306, to identify information stored therein. The querying module 314 may then output the identified information to an appropriate engine or module of the point of sale device 104 as necessary. The querying module 314 may, for example, execute a query on the memory 306 to identify transaction data for submission to a payment network 112 for processing thereof.

The point of sale device 104 may also include or be otherwise interfaced with one or more input devices 316. The input devices 316 may be internal to the point of sale device 104 or external to the point of sale device 104 and connected thereto via one or more connections (e.g., wired or wireless) for the transmission of data to and/or from. The input devices 316 may be configured to receive input from a user of the point of sale device 104, such as the individual 106, which may be provided to another module or engine of the point of sale device 104 (e.g., via the communication module 204) for processing accordingly. Input devices 316 may include any type of input device suitable for receiving input for the performing of the functions discussed herein, such as a keyboard, mouse, click wheel, scroll wheel, microphone, touch screen, track pad, camera, optical imager, etc. The input device 316 may be configured to, for example, read machine-readable codes displayed by the display device 220 of a computing device 102 via an optical imager.

The point of sale device 104 may also include a decoding module 318. The decoding module 318 may be configured to decode data as part of the functions of the point of sale device 104 discussed herein. The decoding module 318 may receive data for decoding, may decode the data to obtain data parsed therefrom, and may output the parsed data to another module or engine of the point of sale device 104. The decoding module 318 may, for example, decode a machine-readable code displayed by a computing device 102 (e.g., and read by the input device 316) to obtain a public key encoded therein, and any other additional data encoded therein, such as a transaction identifier and second public key.

The point of sale device 104 may also include a decryption module 320. The decryption module 320 may be configured to decrypt data as part of the functions of the point of sale device 104 as discussed herein. The decryption module 320 may receive data as input, may decrypt the data, and may output the decrypted data to another module or engine of the point of sale device 104. In some embodiments, the input may include the encryption algorithm(s) used for decryption. In other embodiments, the decryption module 320 may be configured to identify the encryption algorithm(s) to be used, such as by instructing the querying module 314 to execute a query on the memory 306 for identification thereof. The decryption module 320 may be configured to decrypt encrypted payment credentials using public keys decoded by the decoding module 318 from machine-readable codes read by the input device 316.

The point of sale device 104 may also include a transmitting device 322. The transmitting device 322 may be configured to transmit data over one or more networks via one or more network protocols. In some embodiments, the transmitting device 322 may be configured to transmit data over the payment rails, such as using specially configured infrastructure associated with payment networks 112 for the transmission of transaction messages that include sensitive financial data and information, such as identified payment credentials. In some instances, the transmitting device 322 may be configured to transmit data to public data sources 110, computing devices 102, payment networks 112, and other entities via alternative networks, such as the Internet. In some embodiments, the transmitting device 322 may be comprised of multiple devices, such as different transmitting devices for transmitting data over different networks, such as a first transmitting device for transmitting data over the payment rails and a second transmitting device for transmitting data over the Internet. The transmitting device 322 may electronically transmit data signals that have data superimposed that may be parsed by a receiving computing device. In some instances, the transmitting device 322 may include one or more modules for superimposing, encoding, or otherwise formatting data into data signals suitable for transmission.

The transmitting device 322 may be configured to electronically transmit data signals to public data sources 110, which may be superimposed or otherwise encoded with requests for encrypted payment credentials, which may include at least a transaction identifier. The transmitting device 322 may also be configured to electronically transmit data signals to payment networks 112 (e.g., either directly or via one or more intermediate entities), which may be superimposed or otherwise encoded with transaction data for a payment transaction, including decrypted payment credentials. In some embodiments, the transmitting device 322 may also be configured to electronically transmit to computing devices 102, which may be superimposed or otherwise encoded with a notification of completed processing of a payment transaction.

Process for Conducting a Payment Transaction Via Third Party Data Source

Figure 4:
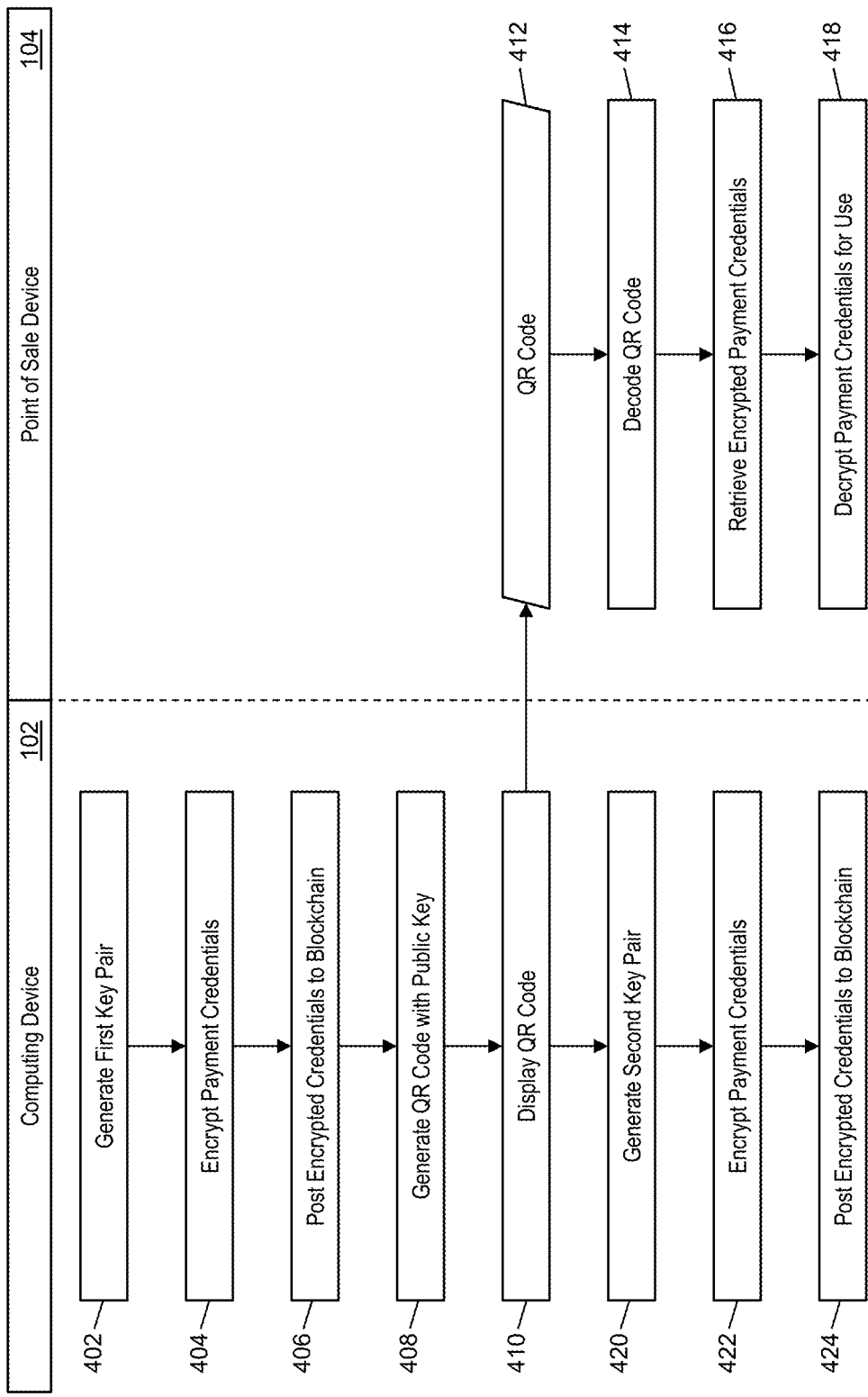
FIG. 4 is a flow diagram illustrating a process for the conveyance of payment credentials to a point of sale device through a third party data source using the system of FIG. 1 in accordance with exemplary embodiments.

FIG. 4 illustrates a process for the conducting of a payment transaction using payment credentials that are retrieved by the point of sale device 104 through a third party data source and usable via data received from the computing device 102.

In step 402, the generation module 216 of the computing device 102 may generate a first key pair using a suitable key pair generation algorithm. The first key pair may be comprised of a private key and a corresponding public key. In step 404, the encryption module 218 of the computing device 102 may encrypt payment credentials stored therein (e.g., in the memory 206 of the computing device 102) using the private key of the first key pair using a suitable encryption algorithm. In step 406, the transmitting device 222 of the computing device 102 may electronically transmit the encrypted payment credentials to the public data source 110 for posting to the blockchain associated therewith. In some instances, step 406 may also include the receipt of a transaction identifier associated with the posting of the encrypted payment credentials to the blockchain.

In step 408, the generation module 216 of the computing device 102 may generate a machine-readable code, such as a bar code or QR code, encoded with at least the public key of the first key pair. In instances where a transaction identifier was received from the public data source 110, the machine-readable code may also be encoded with the transaction identifier. In step 410, the display device 220 of the computing device 102 may display the machine-readable code, such as a QR code. In step 412, the input device 316 of the point of sale device 104 may read the machine-readable code, such as a QR code, as displayed by the computing device 102.

In step 414, the decoding module 318 of the point of sale device 104 may decode the machine-readable code, such as a QR code, to decode the public key of the first key pair encoded therein. In instances where a transaction identifier was obtained for the encrypted payment credentials, the transaction identifier may also be decoded from the machine-readable code. In step 416, the receiving device 302 of the point of sale device 104 may retrieve the encrypted payment credentials from the public data source 110, which may be identified using the transaction identifier, which may be provided to the public data source 110 using the transmitting device 322 of the point of sale device 104. In step 418, the decryption module 320 of the point of sale device 104 may decrypt the encrypted payment credentials using the public key decoded from the machine-readable code, which may then be used in the electronic payment transaction initiated by the point of sale device 104.

In step 420, the generation module 216 of the computing device 102 may generate a second key pair, which may be comprised of a new private key and corresponding public key. In some embodiments, step 420 may be initiated following a predetermined period of time after step 410, or upon the receipt (e.g., by the receiving device 202) of an indication of processing of the transaction (e.g., which may be submitted following step 418 by the point of sale device 104, issuing institution 108, etc.). In step 422, the encryption module 218 of the computing device 102 may encrypt the payment credentials using the private key of the second key pair. In step 424, the transmitting device 222 of the computing device 102 may electronically transmit the newly encrypted payment credentials to the public data source 110 for posting to the blockchain.

Figure 5:
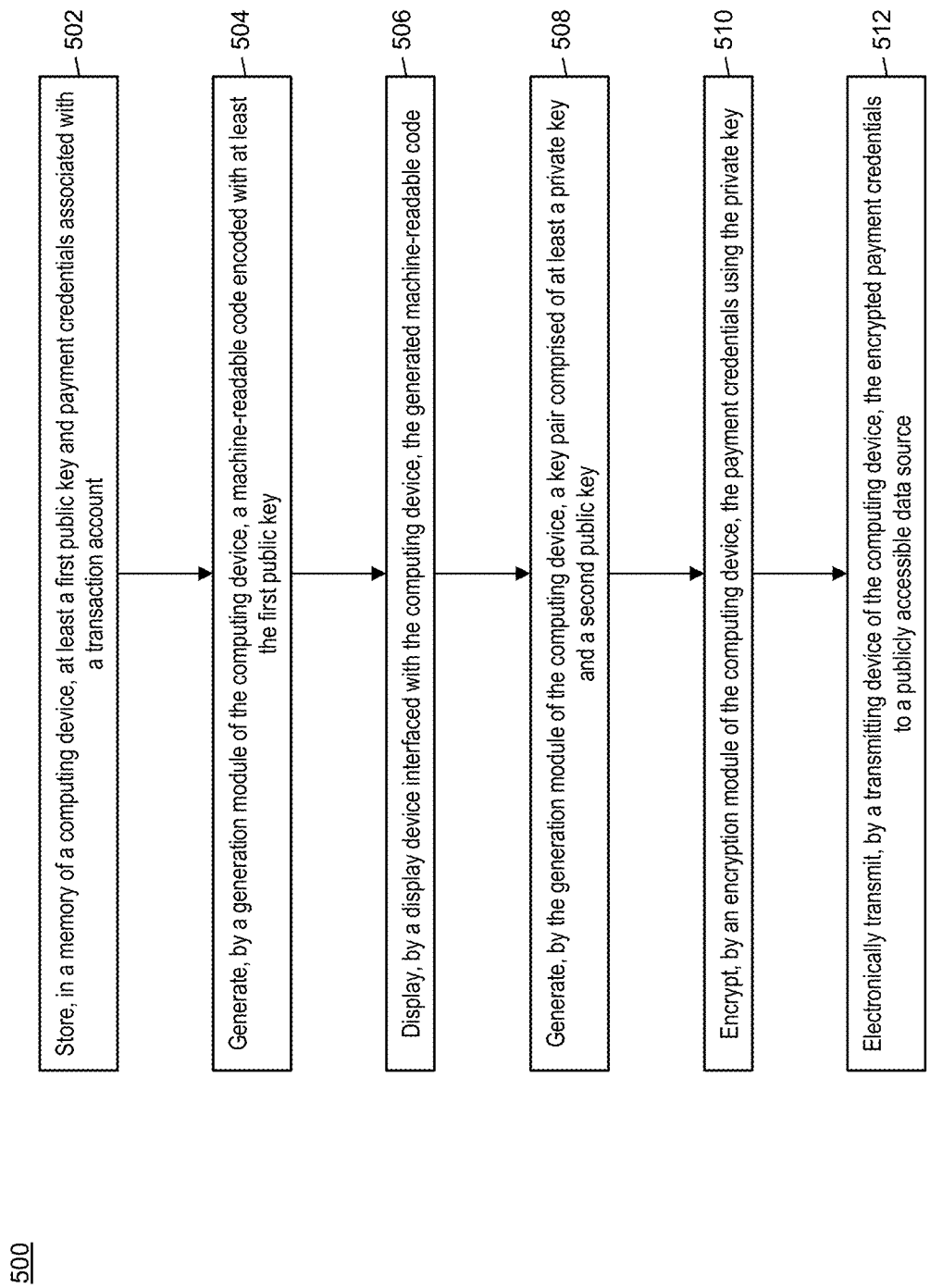
FIG. 5 is a flow chart illustrating an exemplary method for conveyance of payment credentials through a third party data source in accordance with exemplary embodiments.

Exemplary Method for Conveyance of Payment Credentials Through a Third Party Data Source FIG. 5 illustrates a method 500 for the conveyance of payment credentials to a point of sale device from a computing device via a third party, publicly accessible data source.

In step 502, at least a first public key and payment credentials associated with a transaction account may be stored in a memory (e.g., the memory 206) of a computing device (e.g., the computing device 102). In step 504, a machine-readable code encoded with at least the first public key may be generated by a generation module (e.g., the generation module 216) of the computing device 102. In step 506, the generated machine-readable code may be displayed by a display device (e.g., the display device 220) interfaced with the computing device.

In step 508, a key pair comprised of at least a private key and a second public key may be generated by the generation module of the computing device. In step 510, the payment credentials may be encrypted by the encryption module of the computing device using the private key. In step 512, the encrypted payment credentials may be electronically transmitted, by a transmitting device (e.g., the transmitting device 222) of the computing device, to a publicly accessible data source (e.g., the public data source 110).

In one embodiment, the payment credentials may be comprised of one of: an image of a payment card associated with the transaction account and a data file configured to store the payment credentials. In some embodiments, the publicly accessible data source may be a blockchain network. In a further embodiment, the method 500 may further include digitally signing, by a signing module (e.g., the generation module 216) of the computing device, the encrypted payment credentials using an additional private key prior to transmission. In one embodiment, the machine-readable code may be further encoded with an identification value (e.g., a transaction identifier).

Figure 6:
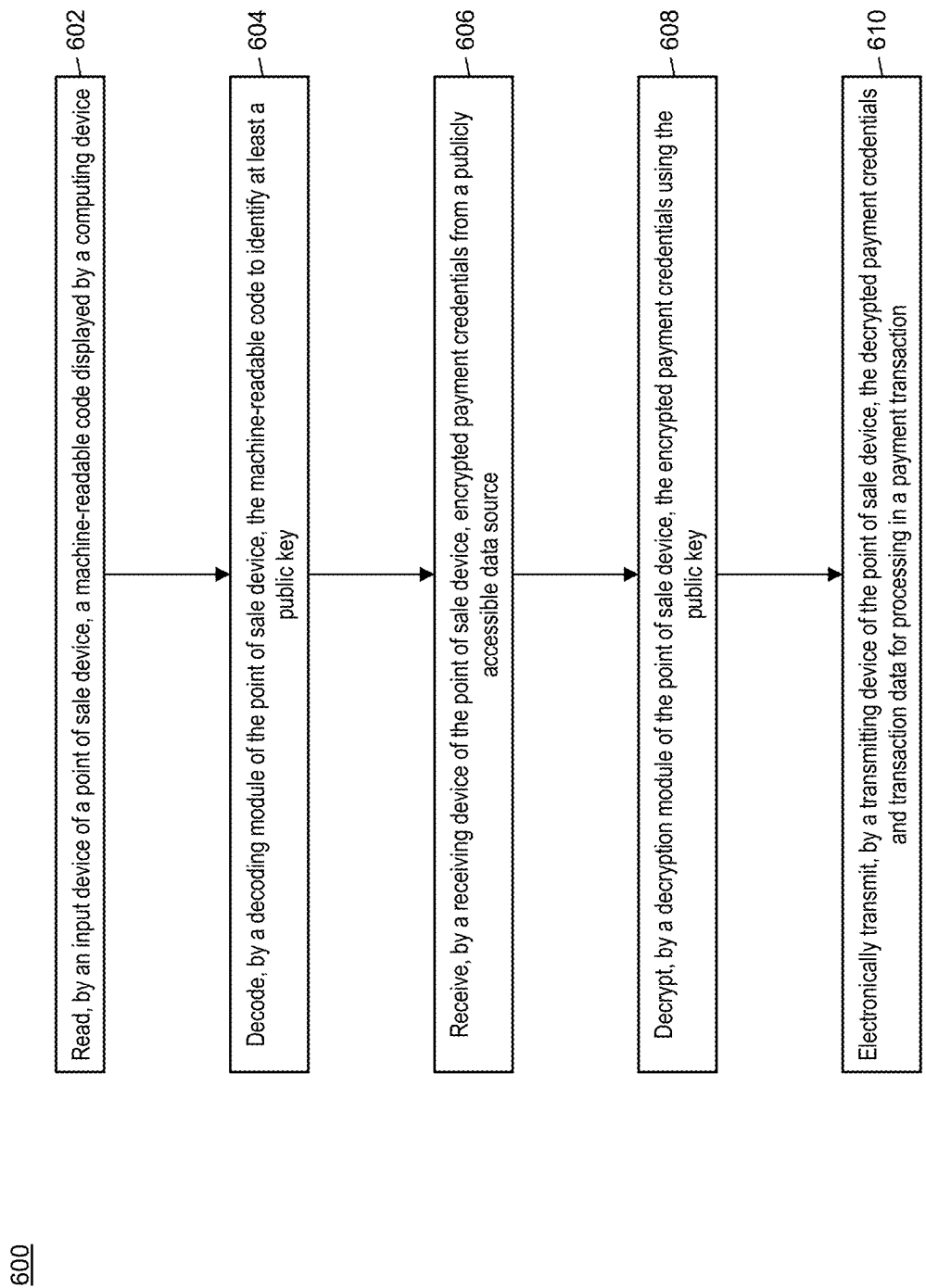
FIG. 6 is a flow chart illustrating an exemplary method for retrieval of payment credentials through a third party data source in accordance with exemplary embodiments.

Exemplary Method for Retrieval of Payment Credentials from a Third Party Data Source FIG. 6 illustrates a method 600 for the retrieval of payment credentials by a point of sale device from a third party, publicly accessible data source facilitated by data received from a computing device.

In step 602, a machine-readable code displayed by a computing device (e.g., the computing device 102) may be read by an input device (e.g., the input device 316) of a point of sale device (e.g., the point of sale device 104). In step 604, the machine-readable code may be decoded by a decoding module (e.g., the decoding module 318) of the point of sale device to identify at least a public key. In step 606, encrypted payment credentials may be received by a receiving device (e.g., the receiving device 202) of the point of sale device from a publicly accessible data source (e.g., the public data source 110).

In step 608, the encrypted payment credentials may be decrypted by a decryption module (e.g., the decryption module 320) of the point of sale device using the public key. In step 610, the decrypted payment credentials and transaction data may be electronically transmitted by a transmitting device (e.g., the transmitting device 322) of the point of sale device for processing in a payment transaction.

In one embodiment, the publicly accessible data source may be a blockchain network. In a further embodiment, decoding the machine-readable code may further identify a blockchain transaction identifier; and the encrypted payment credentials may be received using the blockchain transaction identifier. In some embodiments, decoding the machine-readable code may further identify an identification value. In one embodiment, the decrypted payment credentials may comprise an image of a payment card associated with a related transaction account.

Computer System Architecture

Figure 7:
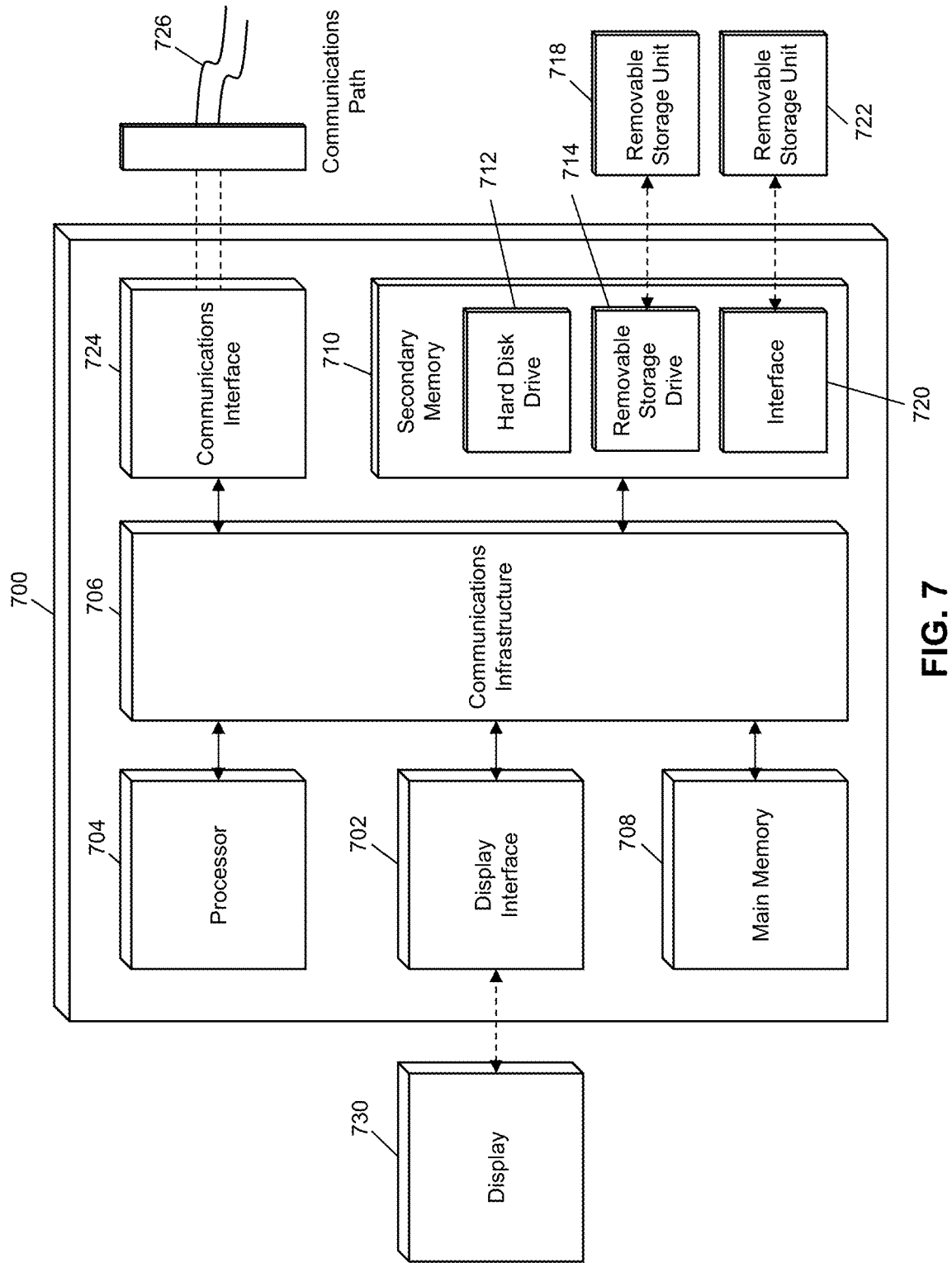
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the computing device 102 and point of sale device 104 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 4-6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 4-6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for conveyance and retrieval of payment credentials through a third party data source. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for retrieval of payment credentials from a third party data source, comprising:
   reading, by an input device of a point of sale device, a machine-readable code displayed by a computing device;
   decoding, by a decoding module of the point of sale device, the machine-readable code to identify at least a public key and a blockchain transaction identifier;
   receive, by a receiving device of the point of sale device, encrypted payment credentials from a publicly accessible data source using the blockchain transaction identifier, wherein the publicly accessible data source is a blockchain network;
   decrypting, by a decryption module of the point of sale device, the encrypted payment credentials using the public key; and
   electronically transmitting, by a transmitting device of the point of sale device, the decrypted payment credentials and transaction data for processing in a payment transaction.

2. The method of claim 1, wherein the decoding step further identifies an identification value.

3. The method of claim 1, wherein the decrypted payment credentials comprise an image of a payment card associated with a related transaction account.

4. A system for retrieval of payment credentials from a third party data source, comprising:
   a point of sale device comprising:
      a processor; and
      a storage memory storing instructions that when executed by the processor causes the processor to perform the operation of:
   read a machine-readable code displayed by a computing device;
   decode the machine-readable code to identify at least a public key and a blockchain transaction identifier;
   receive encrypted payment credentials from a publicly accessible data source using the blockchain transaction identifier, wherein the publicly accessible data source is a blockchain network;
   decrypt the encrypted payment credentials using the public key; and
   transmit the decrypted payment credentials and transaction data for processing in a payment transaction.

5. The system of claim 4, wherein the operation further includes identifying an identification value.

6. The system of claim 4, wherein the decrypted payment credentials comprise an image of a payment card associated with a related transaction account.

\* \* \* \* \*